UNITED STATES PATENT OFFICE.

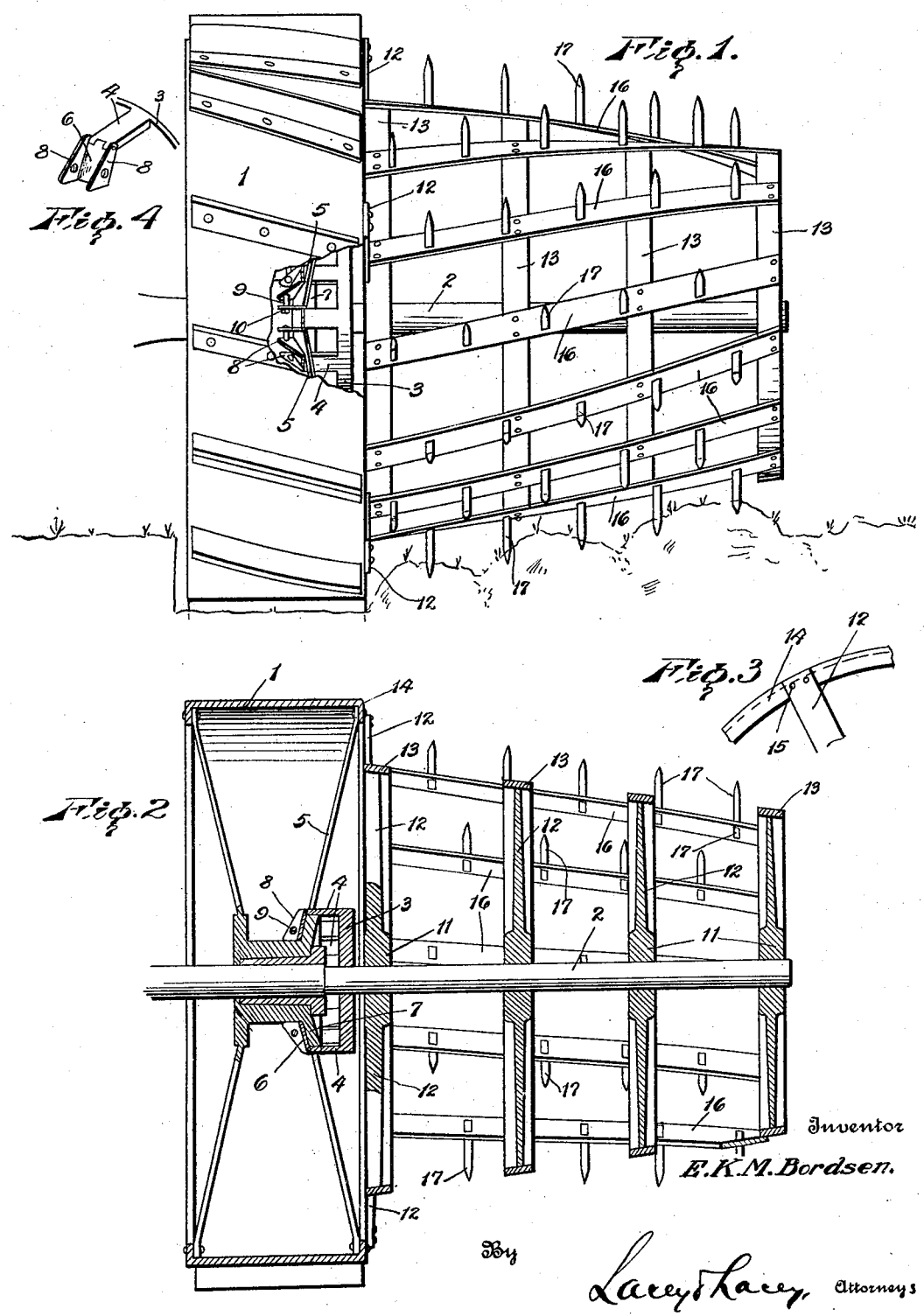

EVANDOR K. M. BORDSEN, OF WEDDERBURN, OREGON.

PULVERIZER ATTACHMENT FOR TRACTORS.

1,398,668.  Specification of Letters Patent.  Patented Nov. 29, 1921.

Application filed November 15, 1920. Serial No. 424,213.

*To all whom it may concern:*

Be it known that I, EVANDOR K. M. BORDSEN, a citizen of the United States, residing at Wedderburn, in the county of Curry and State of Oregon, have invented certain new and useful Improvements in Pulverizer Attachments for Tractors, of which the following is a specification.

This invention seeks to provide an attachment for tractors whereby plowed ground may be thoroughly pulverized and prepared for planting at the same time that new furrows are formed alongside the plowed ground. The invention has as a secondary object the provision of a light but strong apparatus which may be readily attached to the driving wheel of a tractor so as to extend laterally therefrom and travel over the soil turned over by a breaking plow or similar implement simultaneously with the breaking of additional ground by said implement. The invention is illustrated in the accompanying drawings and will be hereinafter fully set forth.

In the annexed drawings—

Figure 1 is a view in rear elevation, partly broken away, of the driving wheel of a tractor having my improved pulverizer secured thereto;

Fig. 2 is a longitudinal section of the same;

Fig. 3 is a detail view showing the manner in which the attachment is secured to the rim of the tractor wheel.

Fig. 4 is a detail view of a portion of the means for securing the attachment to the hub of the tractor wheel.

In the drawing, the reference numeral 1 indicates the ground wheel of a tractor which may be of any well-known type and is adapted to draw plows through the ground. In carrying out my invention, I employ a shaft 2 which may be of any suitable or preferred dimensions and to one end of this shaft I secure a hub 3 from which spaced arms 4 extend longitudinally inwardly so as to project through the spaces between adjacent spokes 5 of the tractor wheel. To the free ends of these arms 4, I hinge clamping members 6 each of which consists of a base plate adapted to bear against the flange 7 of the tractor wheel hub and having lugs 8 at their edges which will project toward the central vertical plane of the tractor wheel and will be so disposed relative to the spokes of the said wheel that each spoke will extend between two clamping members and two of the arms 4 carrying said members. Through the lugs 8 of adjacent clamping members, I insert bolts 9 so that when the nuts 10 thereon are turned home against the respectively adjacent lugs the clamping members will be rigidly secured against the flange 7 of the tractor wheel and held against relative movement. It will be readily understood that the bolts are disposed nearer the inner ends of the clamping lugs so that the circle defined by the bolts will be of less diameter than the circle defined by the arms 4 and, consequently, the hub 3 of the attachment will be securely held to the hub of the tractor wheel and forced to rotate therewith.

At intervals along the shaft 2, I secure thereto collars or hubs 11 from which spokes 12 radiate to rims 13 which are rigidly secured to and carried by the said spokes. A plurality of rolling rings or wheels is thus provided and the diameters of these rings or wheels decrease as they respectively, recede from the tractor wheel. This arrangement puts the greatest strain upon the shaft 2 at its inner end or that end next adjacent the tractor wheel so that the outer free end of the said shaft is not so apt to be bent or broken under the strain imposed thereon in use. The spokes of the innermost wheel are expanded beyond the rim thereof and at their extremities bear against the side flange 14 of the rim of the tractor wheel and are secured rigidly thereto by bolts, as indicated at 15. Secured upon the rims 13 and extending from end to end of the series of rims are bars 16 which are preferably disposed at a slight angle to the longitudinal axis of the device and carried by the said bars 16 are teeth or cutters 17 which project radially therefrom and may be provided in any desired number and of any preferred form.

In using my device, after the tractor has made one or more preliminary trips across the field and produced furrows the combined width of which is about equal to the length of the pulverizing attachment, the attachment is secured to the tractor wheel and, therefore, the soil turned over by the plows will be pulverized, crushed and spread simultaneously with the formation of additional furrows by the plows, it being understood that the tractor wheel will run in one of the furrows so that the teeth or knives of the pulverizing attachment will be enabled to readily penetrate and spread the surface of the turned over ridges. It will be readily noted that the bars 16 carrying the teeth or knives are spaced apart peripherally of the pulverizer so that their edges will tend to cut through the surface of the ridges and thereby spread the same and this action of the said bars is progressive from the outer end thereof to the inner end of the same by reason of the relatively inclined disposition of the bars so that the outer ends will engage the highest ridges and cut through the same and the rolling edges of the bars will successfully engage the ridges nearer the tractor wheel. The hinged connections of the clamping members with the inwardly extending securing arms 4 of the hub of the pulverizer permit the said members to be readily swung into such position that they will clear the hub of the tractor wheel and be swung down behind the same so as to be secured against it. The pulverizer will thus be forced to rotate with the tractor wheel and the strain upon the clamping member is relieved because the innermost spokes 12 are extended to the rim of the tractor wheel and rigidly secured thereto.

Having thus described the invention, what is claimed as new is:

1. A pulverizer comprising a shaft, a plurality of wheels secured to said shaft, ground-breaking members carried by the peripheries of said wheels, and means at one end of said shaft for clamping it to a tractor wheel.

2. A pulverizer comprising a shaft, a plurality of wheels secured to said shaft and spaced longitudinally thereof, ground-breaking members carried by said wheels, means for securing the innermost wheel to a tractor wheel, and means on the inner end of the shaft for securing it to a tractor wheel.

3. A pulverizer comprising a shaft, means for connecting the same to a tractor wheel and supporting it at the side of the wheel, a plurality of wheels secured on said shaft, ground-engaging bars secured to the peripheries of said wheels and connecting the same, and ground-breaking members carried by said bars.

4. A pulverizer comprising a shaft, means for securing the said shaft to a tractor wheel, a plurality of wheels secured upon the said shaft and diminishing in diameter from the inner end of the shaft to the outer end thereof, bars secured to the peripheries of said wheels and extending from the innermost wheel to the outermost wheel and spaced apart peripherally of the wheels, and ground-breaking teeth projecting radially from said bars.

5. A pulverizer comprising a shaft, ground-breaking members carried by said shaft, a hub at the inner end of said shaft, arms extending from said hub parallel with the shaft, clamping members hinged to the free ends of said arms and adapted to engage around the hub of a tractor wheel, and means for connecting said clamping members whereby to secure them around said hub.

In testimony whereof I affix my signature.

EVANDOR K. M. BORDSEN. [L. S.]